Sept. 4, 1934.   R. A. SCHAFER   1,972,462
HYDRAULIC CIRCUIT BACK PRESSURE CONTROL
Filed June 29, 1932   2 Sheets-Sheet 1
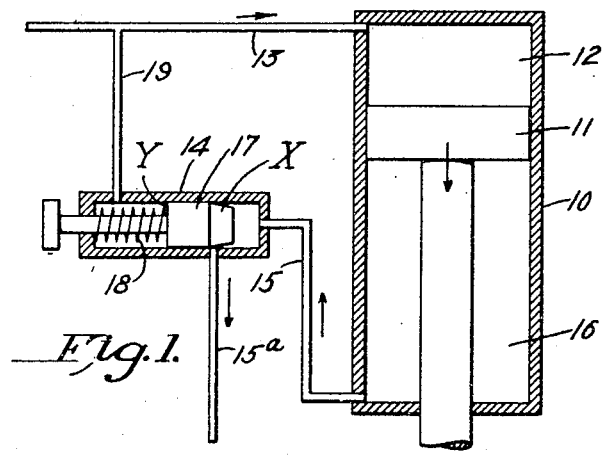
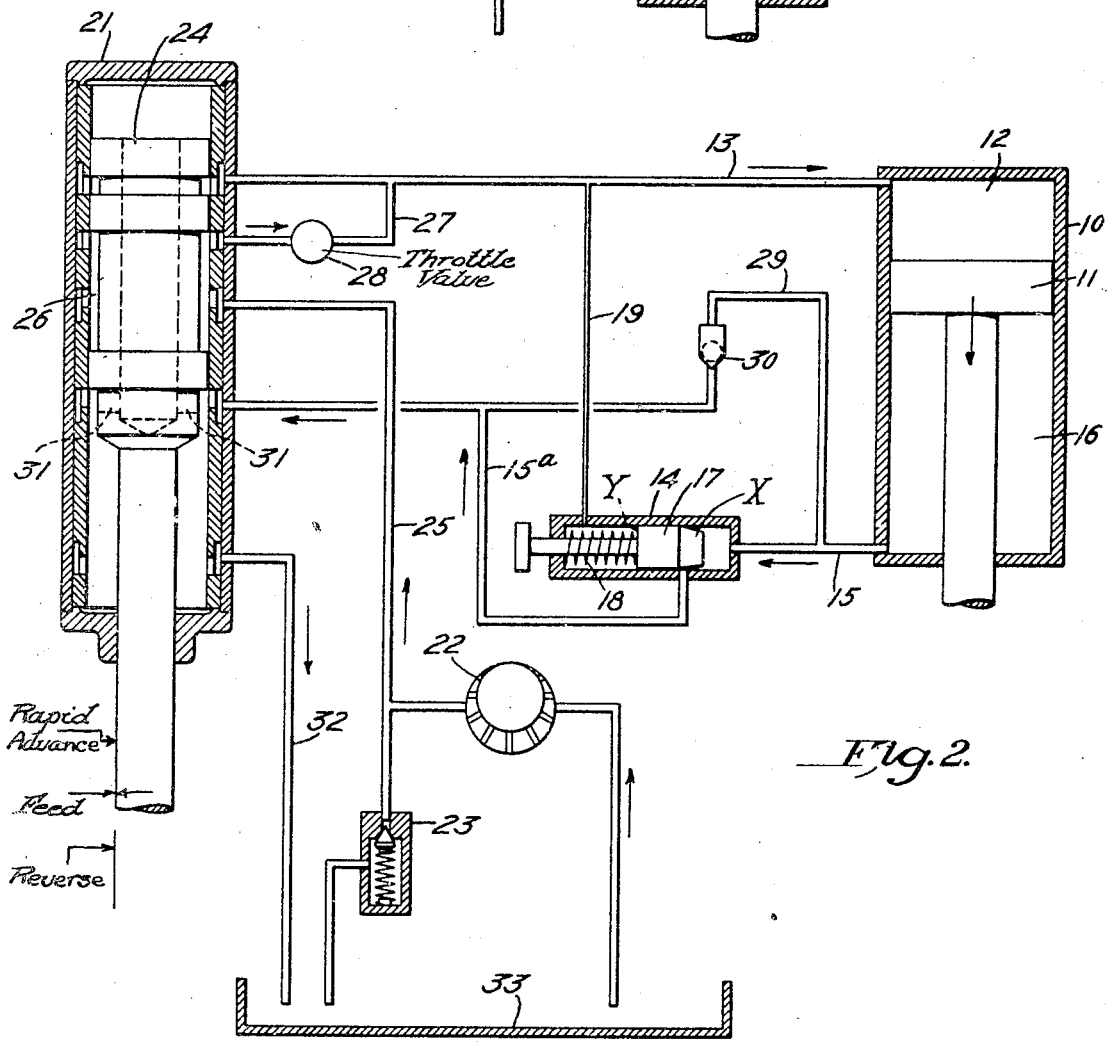
Inventor
Robert A. Schafer
By Attorneys
Nathan, Bowman & Helferich

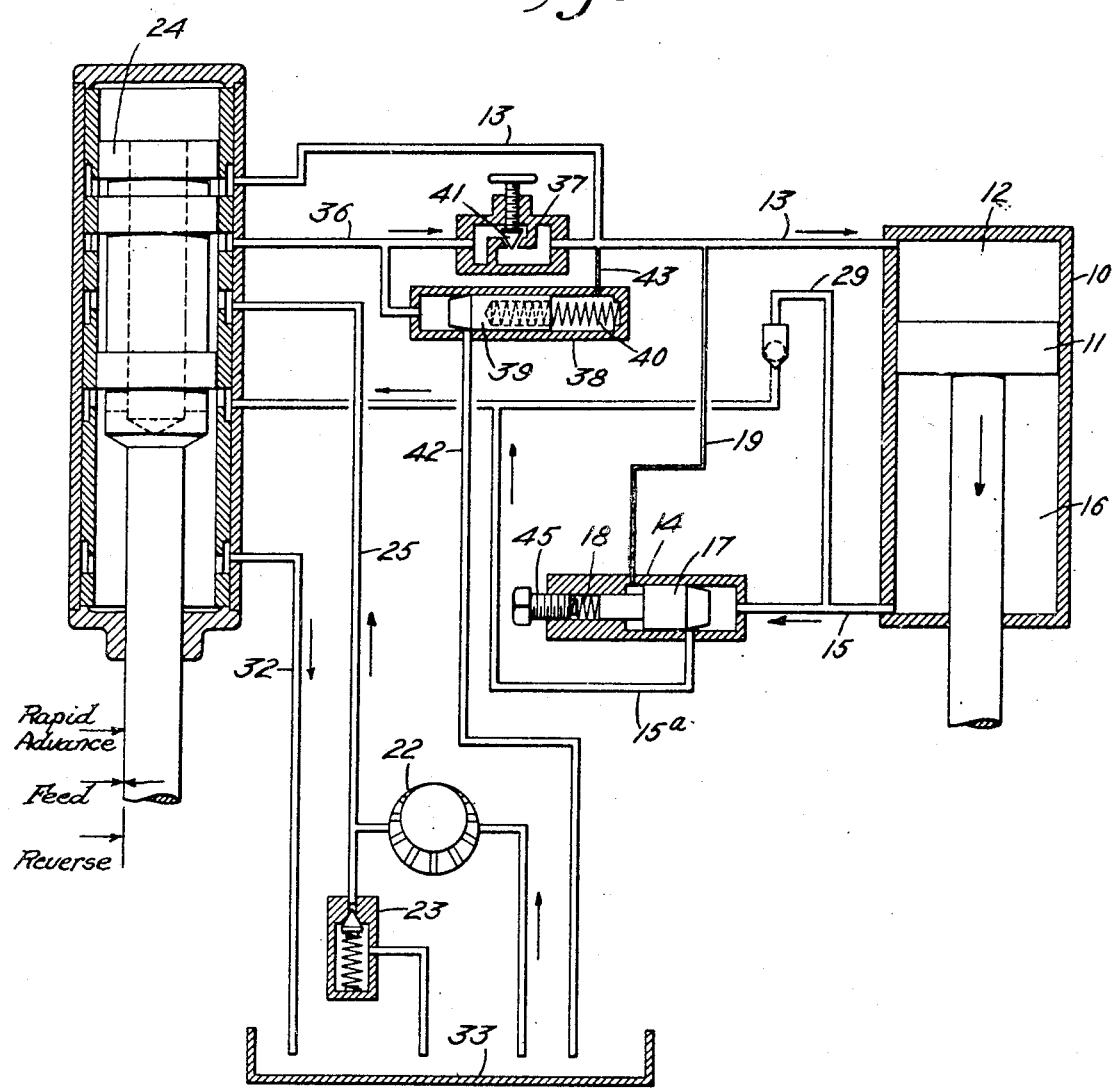

UNITED STATES PATENT OFFICE 1,972,462

HYDRAULIC CIRCUIT BACK PRESSURE CONTROL

Robert A. Schafer, Richmond, Ind., assignor to The National Automatic Tool Company, Richmond, Ind., a corporation of Indiana Application June 29, 1932, Serial No. 619,982

14 Claims. (Cl. 60—52)

This invention is directed to improvements in hydraulic propulsion systems, and is particularly concerned with a hydraulic transmission adapted to meet the conditions obtaining in the operation of machine tools.

In the application of hydraulic drives to machine tools it was early discovered that there is a tendency, under various conditions of operation, for the member being translated to pull away from the propelling instrumentality. This tendency may be either for a brief instant, or continuous for an entire translatory movement. It may be due to a sudden decrease in resistance, or to external forces, the summation of which is a net force urging the movable member forward independently of the hydraulic propelling motor. This tendency to pull away from the propelling motor may be the result of the type of operation being performed such as milling, drilling, boring, or reaming in which rotation of the tool may tend to dig into the work-piece and drag the latter ahead. This latter characteristic is strikingly illustrated by the operation of a milling cutter when rotating in a direction such that the direction of movement at the point of engagement with the work coincides with that produced by the hydraulic propelling motor.

As a remedy for the condition described it has been proposed heretofore to provide means for maintaining a back pressure on the propelling piston. Various arrangements in this respect have been devised to produce either a constant or variable back pressure. Such systems, however, have been complicated, and further are based, for the most part, on the principle of controlling the back pressure by either throttling or bleeding fluid from the forward line. A fundamental principle, however, of the present invention is that of variably throttling the discharge from the back line by means of instrumentalities subjected to and controlled from the combined influence of the pressures in the forward and back line.

The present invention proposes a hydraulic propulsion system which provides means for regulating the rate of supply of hydraulic fluid to the forward line, with means for maintaining a back pressure on the propelling piston through a throttle means subjected to the combined effects of the pressure in the forward and back lines. Such an arrangement insures a steady operation and that the selected speed attempted to be attained, through regulation of the supply to the forward line, as a matter of fact, will be effected and maintained.

A particularly notable characteristic of the system, as thus organized, is that of providing a back pressure which is proportional to the positive work resistance and, therefore, to the forward pressure. When heavy feeds are used great care must be taken to prevent the tool from pulling ahead. Since the back pressure in this system is proportional to the pressure exerted for feeding the tool, this tendency is automatically overcome.

This characteristic is in contrast to prior devices in which e. g. a back pressure valve has been employed of the spring set type, which produced back pressure of a constant value opposing the feeding pressure. The disadvantage of this has been that when the work resistance is light, a heavy back pressure results in proportion to the feed pressure; whereas, when the work resistance is high, as with a heavy feed, a light back pressure relative to the forward pressure exists which is not very effective and does not accomplish the results of the present system.

Although the construction of this invention varies with the work resistance, as stated above, and automatically adjusts itself to accomplish this result, yet it provides a minimum back pressure at very light feeds and this condition obtains even for a negative resistance in which the operation of the tool on the work tends continuously to pull the translatory member forward.

The organization here disclosed is very simple and economical in its initial construction, and operates with exceptional efficiency and accuracy. Adjustment for selected rates of movement may be easily accomplished, and are thereafter dependably maintained. The nature of the system, as a whole, enables it to be readily applied to a wide variety of machines and conditions. This advantageous characteristic is particularly enhanced by the fact that the system may be analyzed and expressed in simple algebraic values and the effect of variations in work resistance, spring pressures, and working areas readily determined.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a simple diagrammatic figure illustrating a fundamental characteristic involved; Fig. 2 is a more complete system but likewise in diagrammatic form; and Fig. 3 depicts a system similar to that of Fig. 2 but illustrating details of a control mechanism for regulating the supply of hydraulic fluid.

Figure 1 illustrates in simple form a fundamental characteristic of this invention. The structural elements include a motor cylinder 10 in which operates a piston 11 presumed to be connected to some translatable member such as a tool or work carrying head. Arrows indicate the direction of flow of the hydraulic fluid. Hydraulic fluid under pressure is supplied to the forward end 12 through conduit 13. A variable back pressure or throttle valve 14 is connected in the conduit 15 leading from the rearward end 16 of the motor. Discharge through the outlet pipe 15ª to a reservoir e. g. is controlled by the plunger 17. The back pressure in the line 15 and rear end 16 of the motor will be a function of the spring 18, pressure in the forward line 13 acting through branch 19 on an area Y of the plunger 17, and the pressure in the back line acting on an area X of the plunger 17. In the instant construction the area X is to be considered as substantially the cross sectional area of the plunger 17. The pressures across the valve will be algebraically expressed as: the back pressure in pounds per square inch, times area X in square inches, equals the foward pressure in pounds per square inch, times area Y in square inches, plus the pressure of spring 18. From which it will be apparent that the back pressure will equal the sum of the forward pressure times area Y and the spring pressure both divided by area X. As the work resistance increases in positive values the forward pressure will increase, and the back pressure will proportionately increase due to increased pressure on area Y and the tendency of valve member 17 to close the discharge through line 15.

As a typical example of the pressures which may be established in a device of this construction let it be assumed that it is desired to have a pressure of 200 pounds per square inch on cylinder end 12 and 50 pounds per square inch on cylinder end 16. Assume further that valve piston area X is 1 square inch and area Y is .2 square inches. Then the total fluid pressure on area Y is 200 times .2 equals 40 pounds. If the spring pressure is made 10 pounds then the back pressure will be 50 pounds in view of area X having been chosen as unity. Any tendency of the back pressure to increase or decrease from 50 pounds will result in a corresponding increase or decrease respectively in the opening through the valve. With the structural proportions assumed, any increase or decrease in the forward pressure resulting from an increase or decrease in the external resistance to movement of piston 11, will result in a direct proportional increase or decrease in the back pressure. Save, however, the back pressure will not decrease beyond a point which is equal to the spring pressure divided by area X which limit in the present case would be 10 pounds per square inch.

The principle above described is diagrammatically illustrated in Fig. 2 in a propulsion system with means for regulating and controlling the direction of flow to produce a cycle of reciprocatory motion. This system, as shown, is provided with a directional valve 21; and a source of supply shown as a constant displacement pump 22 of the vane type. The pump has a maximum pressure relief and by-pass valve 23. The directional valve member 24 may be operated through any known combination of manual and/or automatic control means desired. For an automatic control, in part or completely, there would be suitable dogs, linkages, etc. for moving the valve member 24 in accordance with and at predetermined positions of a movable head as derived from operation of the piston 11.

A typical cycle will now be briefly described. Arrows and suitable legends indicate the several valve positions respectively, and the steps of a typical cycle. Arrows applied to the pipe lines indicate the direction of flow of hydraulic fluid for the particular valve position shown. With the valve 24 in the position shown, the pump 22 will supply hydraulic fluid through the pipe 25, annular groove 26 of the valve, and branch pipe 27 connecting with the conduit 13 leading to the forward end 12 of motor cylinder 10. Piston 11 will proceed on its downward movement at a rate determined by the regulation of the supply. For this purpose a regulating throttle valve 28 may be incorporated in the forward line.

If an adjustable discharge pump is employed in place of the vane type pump illustrated at 22, the regulation at throttle valve 28 may be omitted.

A branch conduit 29 connects with the back line 15, but no discharge takes place therethrough at this time by reason of the check valve 30 inserted therein. A back pressure will be maintained in the rear end 16 of the cylinder and in back line 15 during this downward working stroke of the piston, just as has been described in connection with Fig. 1. At the completion of this stroke, valve 24 will be shifted downwardly to a position where discharge pipe 25 of the pump communicates through annular groove 26 of the valve with conduit 29 leading to the lower end of cylinder 10. Discharge from the upper end of the cylinder takes place through pipe 13 to the upper end of valve casing 21 and through the hollow interior of valve member 24 and openings 31 and drain pipe 32 to the reservoir 33. For the next position valve 24 may be initially moved to its extreme upper position wherein discharge from the pump will pass freely into pipe 13 by-passing the throttle valve 28. This step, if employed, would normally be used for a rapid advance between the work and tool, the valve 24 being again shifted to the position shown when the work and tool were about to engage.

The system just described provides a simple, efficient hydraulic transmission regulatable as to speed and provided with a variable back pressure to ensure steady operation and against overrunning.

Figure 3 illustrates a typical and particularly advantageous application of the principles of the invention. This system is quite similar to that of Fig. 2 but discloses further details of a means for accurately regulating the speed of movement. The various conduits and valve and cylinder elements are, for the most, similar to those of Fig. 2 and are, accordingly, indicated by the same reference characters.

Details of the throttle control means of Fig. 3 will now be described. The line 13 has a branch 36 in which is located the adjustable valve 37. Means are provided for maintaining a constant pressure difference across this valve 37 comprising a valve 38 having the plunger 39 subjected on opposite ends to the pressure in the branch 36, and the main conduit 13. This constitutes a bypass or bleed line to the main reservoir. The pressure difference across the valve 37, it will be perceived, is always equal to the pressure of spring 40 divided by the cross sectional area of the valve member 39. The rate of flow through line 13 to the motor 10, during the working stroke when valve 24 is in the position shown will vary with the area exposed to flow across the valve 37. The area, of course, may be readily and accurately adjusted for any rate desired by adjustment of the valve member 41. For any given setting of the valve member 41 the flow will remain constant irrespective of variations of pressure in the forward end 12 of cylinder 10 resulting from variations in the work resistance. This is true since the flow across valve 37 is determined by pressure difference only and is not a function of the absolute pressures. It is to be noted in this respect that the system is provided with a source of pressure fluid adapted to supply fluid at a constant rate. In the present case this is diagrammatically illustrated as a vane type pump 22. The capacity of pump 22 will, of course, be in excess of any feed rate required, and will be determined more by the rate desired for rapid traverse. With an over supply of fluid for feed traverse the excess will normally be bypassed through valve 38 and out the discharge pipe 42. Referring now again to the absolute pressures, assuming a given setting of valve member 41, variations in resistance to movement of piston 11 will cause variations of pressure in line 13. As this pressure increases it will be transmitted through connection 43 to the rear of valve plunger 39 and tend to close the by-pass opening to pipe 42. The pressure in line 36 will, as a result, be increased and although the absolute pressure in line 13 has increased, the absolute pressure in line 36 will increase in the same amount and the pressure difference across valve 37 be maintained at a constant value dependent upon the force of spring 40. Upon a reduction of work resistance, and a corresponding reduction of pressure in line 13, the converse of the above takes place.

With a back pressure maintained on the back line proportional to the work resistance and thereby to the absolute pressure in line 13; and with the constant rate of supply to the forward end of cylinder 10, the steady movement of piston 11 and thereby of the mechanism to which it is attached, is assured.

If desired the spring pressure on the valve member 17 may be adjusted for different cases, by means of suitable mechanism such as the adjustable screw abutment 45. Adjustment of screw 45 will produce a corresponding change in the relative back pressure.

The successive positions of the valve member 24 may be accomplished by any valve actuating mechanism suitable for the cycle to be employed. One such mechanism is shown in my prior application, Serial No. 577,405, filed November 26, 1931. Or any other well known type of valve actuating mechanism capable of producing the cycle of movements desired may be adopted, such as that shown in the patent to Galloway, No. 1,685,049.

A normal and typical cycle of the transmission system shown in Fig. 3 would be similar to that described in connection with Fig. 2. Fig. 3 shows the position of valve 24 during a relatively slow working operation. Movement of the valve 24 downward to a position where pipe 25 is placed in direct communication with pipe 29, and pipe 13 is open to exhaust above valve 24 would result in reverse movement of piston 11. Shifting of valve 24 to its extreme upper position would connect pump discharge line 25 with the line 13 for a rapid traverse movement down. It will be understood that a more or less specific arrangement has been shown adapted particularly for a type of cycle in which a working stroke is only required in one direction, but that the principle of this invention may be readily applied to apparatus designed for a working stroke in either or both directions.

The invention just described has the advantage of being readily analyzed to determine the proportions and adjustments preferable for a particular set of conditions. An example of this will be given. Assume the following:

$F_p$=Forward pressure in pounds per square inch.
$B_p$=Back pressure in pounds per square inch.
$S$=Total pressure of spring 18.
$A$=Forward piston area in square inches.
$a$=Piston area on back pressure side.
$X$=Net area in square inch of valve 17 exposed to back pressure.
$Y$=Net area in square inch of valve 17 exposed to forward pressure.
$R$=Total external resistance to piston movement.

In the above R would be the total resistance offered by the engagement of the tool and work, for example, plus other resistances such as friction of the carrier on its ways. As has been pointed out the engagement of the tool with the work may be such as to cause a net forward urge and R thereby be negative in value.

Adopting the above values it will be apparent that, (1) $\qquad F_pA=B_pa+R$, or $B_pa=F_pA-R$ Across the valve 17, (2) $\qquad F_pY=B_pX-S$, then $F_p=\dfrac{B_pX-S}{Y}$ Substituting the value of $F_p$ in the first equation, $$B_pa=\dfrac{A(B_pX-S)}{Y}-R$$

Transforming this latter equation, (3) $\qquad B_p=\dfrac{RY+SA}{AX-aY}$ (4) From Equation (2) $B_p=\dfrac{F_pY+S}{X}$ Substituting this latter value in Equation (1) and transforming and solving, (5) $\qquad F_p=\dfrac{aS+RX}{AX-aY}$ Equation (3) may be expressed as, $$B_p=R\dfrac{Y}{AX-aY}+\dfrac{SA}{AX-aY}$$

and this may be more simply expressed as, (6) $\qquad B_p=RC+K$ where C and K are each a constant dependent upon fixed characteristics of the transmission including the areas of the main piston faces, and spring pressure and areas of the valve 14.

From Equations (3), (5) and (6) it is clear that the only variable on the right hand side is R in each case, and it is further apparent that $B_p$ or $F_p$ will vary directly as R.

In the examples given in the drawings the piston 11 has been shown as a differential piston. This is a matter of choice, however, and the piston rod, if desired, may extend through the opposite end of the cylinder also, and A would then equal $a$. For the purpose of simplicity let it be assumed that this is the case and that $A=a=12$ sq. in. Then adopting the values of X, Y and S heretofore assumed let us take a corresponding specific example and determine the value of the back pressure. Substituting the numerical values in Equation (3)—

$$B_p = \frac{.2R + 10 \times 12}{1 \times 12 - .2 \times 12} = \frac{R}{48} + 12.5$$

It will be observed that the back pressure for the values of X and S adopted would not be less than 10 pounds per square inch, and if the possible value of R should be a negative value and sufficiently high to bring the above equation without this range, then some adjustment in the value of X or S should preferably be made.

The above is indicative of the manner in which a proportioning of the parts and values may be determined upon and selected for a given set of conditions.

Without further analysis, the foregoing will so fully reveal the gist of this invention that others can, by applying current knowledge, readily adapt it for various utilizations by retaining one of more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:—

1. An hydraulic system combining a motor; hydraulic fluid supply means; conduit means connecting said supply means to said motor; discharge conduit means from said motor; adjustable throttle means in said discharge conduit means to maintain a back pressure on said motor; means for varying said throttle means directly as the pressure varies in said supply conduit means; and means for varying said throttle means inversely as the pressure varies in said discharge conduit means.

2. An hydraulic transmission system combining a motor adapted to be connected to operate against an external variable resistance; hydraulic fluid supply means; conduit means connecting said supply means to said motor; discharge conduit means from said motor; and means responsive to variations in pressure in said supply conduit means for maintaining a back pressure in said discharge conduit means directly proportional to said external resistance.

3. An hydraulic transmission combining a motor adapted to be connected to an external variable resistance; hydraulic fluid supply means for said motor; discharge conduit means for said motor; and means for maintaining a back pressure in said discharge conduit means variable according to the relation, back pressure$=CR+K$ where R represents said variable resistance and C and K are each constant values dependent upon fixed characteristics of said transmission.

4. An hydraulic transmission combining a motor adapted to be connected to an external variable resistance; hydraulic fluid supply means for said motor; discharge conduit means for said motor; means for variably resisting the discharge through said conduit means to maintain a back pressure in said conduit means; and means responsive to variations in pressure in said fluid supply means for adjusting said discharge resisting means in direct proportion to said external variable resistance on said motor.

5. An hydraulic transmission combining a motor; a source of hydraulic fluid under pressure; conduit means connecting said source to said motor; discharge conduit means for said motor; means for variably resisting the discharge through said discharge conduit means to maintain a back pressure on said motor; and means responsive to pressures in said supply conduit means for variably adjusting said resistance to discharge directly as the pressure varies in said supply conduit means.

6. An hydraulic transmission combining a motor; a source of hydraulic fluid under pressure; supply conduit means connecting said source to said motor; discharge conduit means for said motor; means for variably resisting the discharge through said discharge conduit means to maintain a back pressure on said motor; means for varying said resistance directly as the pressure varies in said supply conduit means; and means for varying said resistance indirectly as the pressure varies in said discharge conduit means.

7. An hydraulic transmission combining a motor; a source of hydraulic fluid under pressure; supply conduit means connecting said source to said motor; discharge conduit means for said motor; means for variably resisting the discharge from said motor to maintain a back pressure thereon; first means responsive to pressures in said supply conduit means for increasing said resistance as the pressure in said supply conduit increases; supplementary constantly acting impositive means tending to increase said resistance; and means responsive to pressures in said discharge conduit means opposed to said first and supplementary means and tending to decrease said resistance means as the pressure in said discharge conduit means increases.

8. An hydraulic transmission combining a motor; a source of hydraulic fluid under pressure; supply conduit means connecting said source to said motor; discharge conduit means for said motor; variable throttle means in said discharge conduit means for maintaining a back pressure in said motor; means responsive to variations of pressure in said supply conduit means for varying said throttle means; and means responsive to variations in said discharge conduit means for varying said throttle means, said pressure responsive means being opposed in their effect on said throttle means.

9. An hydraulic transmission combining a motor; a source of hydraulic fluid under pressure; supply conduit means connecting said source to said motor; a discharge conduit for said motor; variable throttle means therein adapted to maintain a predetermined back pressure on said motor; means for variably modifying said throttle means and thereby said back pressure directly with variations in pressure in said supply conduit means; and means for variably modifying said throttle means inversely with variations of pressure in said discharge conduit.

10. An hydraulic transmission combining a motor; a source of hydraulic fluid under pressure; supply conduit means connecting said source to said motor; discharge conduit means for said motor; main valve means for controlling the admission and discharge of fluid to produce a cycle of movement of said motor; spring pressed throttle valve means in said discharge conduit means to produce a back pressure on said motor; means responsive to pressure in said supply conduit means and effective on said throttle valve means to vary the back pressure directly with variations of pressure in said supply conduit means, and means responsive to pressure in said discharge conduit means and effective on said throttle means to vary the back pressure inversely with variations in pressure in said discharge conduit means.

11. A hydraulic power means combining a hydraulic motor with fluid supply and discharge means and having a piston exposed on one side to the forward pressure and on the opposite side to the back pressure; and means for variably adjusting the back pressure comprising an adjustable throttle valve, spring means for urging said valve in a closing direction; means operated from the forward pressure to urge said valve in a closing direction in accordance with the forward pressure; and means operated from the back pressure for urging said valve in a closing direction in accordance with the back pressure.

12. An hydraulic transmission combining a motor; a source of hydraulic fluid adapted to supply fluid to said motor at a constant rate; conduit means connecting said source to said motor; discharge conduit means for said motor; main valve means for controlling the cycle of said motor; variable throttle means in said discharge conduit means for maintaining a back pressure on said motor; and means responsive to pressure in said supply conduit means for variably adjusting said throttle means to vary the back pressure directly as the pressure varies in said supply conduit means.

13. An hydraulic transmission system combining a motor adapted to be connected to a variable external resistance; a source of hydraulic fluid adapted to supply fluid to said motor at a constant rate; supply conduit means for said motor; discharge conduit means for said motor; main control valve means therefor; and means for maintaining a back pressure in said discharge conduit directly proportional to said external resistance.

14. An hydraulic transmission combining a motor adapted to be connected to a variable external resistance in its working operation; a source of hydraulic fluid adapted to supply fluid to said motor at a constant rate; supply conduit means connecting said source and motor; discharge conduit means for said motor, said motor having a piston exposed simultaneously on opposite sides thereof to the supply and the discharge pressure respectively; main control valve means for said motor; and means for maintaining a back pressure in said discharge conduit means directly proportional to said external resistance.

ROBERT A. SCHAFER.